United States Patent
Ntoulas et al.

(10) Patent No.: US 7,685,112 B2
(45) Date of Patent: Mar. 23, 2010

(54) METHOD AND APPARATUS FOR RETRIEVING AND INDEXING HIDDEN PAGES

(75) Inventors: Alexandros Ntoulas, Los Angeles, CA (US); Junghoo Cho, Los Angeles, CA (US); Petros Zerfos, Santa Monica, CA (US)

(73) Assignee: The Regents of the University of California, Oakland, CA (US)

( * ) Notice: Subject to any disclaimer, the term of this patent is extended or adjusted under 35 U.S.C. 154(b) by 349 days.

(21) Appl. No.: 11/570,330

(22) PCT Filed: May 27, 2005

(86) PCT No.: PCT/US2005/018849

§ 371 (c)(1),
(2), (4) Date: Dec. 8, 2006

(87) PCT Pub. No.: WO2006/007229

PCT Pub. Date: Jan. 19, 2006

(65) Prior Publication Data

US 2008/0097958 A1    Apr. 24, 2008

Related U.S. Application Data

(60) Provisional application No. 60/580,543, filed on Jun. 17, 2004.

(51) Int. Cl.
*G06F 17/30* (2006.01)
*G06F 15/173* (2006.01)

(52) U.S. Cl. ............................ 707/3; 715/255; 709/238

(58) Field of Classification Search ................ 707/3, 707/5; 708/200, 422–446, 490; 715/255; 709/238
See application file for complete search history.

(56) References Cited

U.S. PATENT DOCUMENTS 6,285,999 B1 * 9/2001 Page ............................ 707/5
6,625,619 B1   9/2003 McClendon et al.

(Continued)

OTHER PUBLICATIONS

Bergan, Michael K., "The Deep Web: Surfacing Hidden Value", BrightPlanet—Deep Content, http://beta.brightplanet.com/deepcontent/tutorials/DeepWeb/index.asp, Sep. 24, 2001 (17pp).

(Continued)

*Primary Examiner*—Tim T. Vo
*Assistant Examiner*—Bao G Tran
(74) *Attorney, Agent, or Firm*—Vista IP Law Group LLP

(57) ABSTRACT

A method and system for autonomously downloading and indexing Hidden Web pages from Websites includes the steps of selecting a query term and issuing a query to a site-specific search interface containing Hidden Web pages. A results index is then acquired and the Hidden Web pages are downloaded from the results index. A plurality of potential query terms are then identified from the downloaded Hidden Web pages. The efficiency of each potential query term is then estimated and a next query term is selected from the plurality of potential query terms, wherein the next selected query term has the greatest efficiency. The next selected query term is then issued to the site-specific search interface using the next query term. The process is repeated until all or most of the Hidden Web pages are discovered.

18 Claims, 14 Drawing Sheets

U.S. PATENT DOCUMENTS

| | | | |
|---|---|---|---|
| 6,711,569 | B1 | 3/2004 | Bushee |
| 6,741,979 | B1 | 5/2004 | Tiahrt |
| 2002/0065857 | A1 | 5/2002 | Michalewicz et al. |
| 2002/0078095 | A1 | 6/2002 | Culham |
| 2003/0055831 | A1 | 3/2003 | Ryan et al. |
| 2003/0140121 | A1 | 7/2003 | Adams |
| 2003/0212737 | A1 | 11/2003 | Moricz et al. |
| 2004/0015909 | A1 * | 1/2004 | Cho et al. .................... 717/143 |

OTHER PUBLICATIONS

Ntoulas, Alexandros, et al., "Downloading Textual Hidden Web Content Through Keyword Queries", JCDL'05, Jun. 7-11, 2005, Denver, Colorado, USA (10pp).

* cited by examiner

| Term $t_k$ | $N(t_k)$ |
|---|---|
| model | 10 |
| computer | 38 |
| digital | 50 |

After $q_1, \ldots, q_{i-1}$

Total Pages: 50

Fig. 6A

| Term $t_k$ | $N(t_k)$ |
|---|---|
| model | 12 |
| computer | 20 |
| disk | 18 |

New from $q_i$ = computer

New Pages: 20

Fig. 6B

| Term $t_k$ | $N(t_k)$ |
|---|---|
| model | 10+12 = 22 |
| computer | 38+20 = 58 |
| disk | 0+18 = 18 |
| digital | 50+0 = 50 |

After $q_1, \ldots, q_i$

Total Pages: 50 + 20 = 70

Fig. 6C

METHOD AND APPARATUS FOR RETRIEVING AND INDEXING HIDDEN PAGES

REFERENCE TO RELATED APPLICATIONS

This Application is a U.S. National Stage filing under 35 U.S.C. §371 of International Application No. PCT/US2005/018849, filed 17 May 2005, which claims priority of U.S. Provisional Patent Application No. 60/580,543 filed on Jun. 17, 2004. The contents of the aforementioned application is hereby incorporated herein by reference in its entirety. Priority to the aforementioned application is hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support of Grant number 9986679 awarded by the National Science Foundation. The government has certain rights in this invention.

FIELD OF THE INVENTION

The field of the invention generally relates to methods and systems used to access, index, and acquire information stored on a Wide Area Network (WAN) such as the Internet. More specifically, the field of the invention generally relates to methods and systems used to autonomously locate and acquire so-called "hidden" or "deep" Web pages accessible via the Internet or similar WAN.

BACKGROUND OF THE INVENTION

The Internet is becoming increasingly important as a repository of information. For example, such information may be stored on the World Wide Web ("Web") in the form of Web pages. To search or access information located on the Web, a user typically uses a search engine such as, for example, GOOGLE, YAHOO, ASK JEEVES, MSN SEARCH or the like. Search engines generally operate by creating indices by spidering or crawling over Web pages. Typical crawlers today discover and index Web pages simply by following the hyperlinks from one page to another. Using this method, in order for the search engines to index a page, the page has to be static and, in addition, have other pages linking to it, so that it can be discovered through the crawling. Unfortunately, an ever-increasing amount of information is available to users only through site-specific search interfaces. In order to access these Web pages, a user must input one or more keywords or text strings into the site-specific search interface. Conventional search engines are unable to discover and index these pages because they are dynamically generated—there are no static links to these pages. These "hidden" pages are often referred to as the "Hidden Web" or the "Deep Web."

The volume of information contained in the Hidden Web is increasing rapidly as many entities and organizations place their content online through easy-to-use Web interfaces. For example, the Securities and Exchange Commission and the United States Patent and Trademark Office each make available public documents via Web-based search interfaces. The content of these databases is, however, hidden from users that are searching using conventional search engines. Moreover, the content of many Hidden Websites is often highly relevant and useful to particular searches performed by users. For example, PubMed hosts numerous high-quality documents on medical research that have been selected from a carefully conducted peer-review process. The documents contained in the PubMed database are generally hidden from users unless they use the site-specific search interface.

There thus is a need for a method and system that is capable of automatically identifying and downloading Web pages from the Hidden Web so that conventional search engines (e.g., GOOGLE, YAHOO, ASK JEEVES, MSN SEARCH, etc.) can index and subsequently access the pages. There also is a need for a method and system for the generic information retrieval from Hidden Web pages. The method may be implemented using a software program such as a crawler that automatically downloads Web pages for search engines. Preferably, the crawler is able to download or otherwise make available Web pages such that current search engines are able to index the Web pages. Alternatively, Hidden Web pages may be downloaded or replicated locally on a user's computer. The Hidden Web pages are thus made available to users via conventional search engines.

The method and system of downloading and indexing Hidden Web pages will allow typical Internet users to easily access information from a single location (e.g., a single search engine) that, previously, was available only by searching through site-specific search interfaces. The method and system would improve the overall user experience by reducing wasted time and effort searching through a multitude of site-specific search interfaces for Hidden Web pages. Finally, current search engines introduce a significant bias into search results because of the manner in which Web pages are indexed. By making a larger fraction of the Web available for searching, the method and system is able to mitigate the bias introduced by the search engine to the search results.

SUMMARY OF THE INVENTION

The present invention is directed to a system and method for autonomously downloading and indexing Hidden Web pages from Websites having site-specific search interfaces. In a preferred embodiment, the method is implemented using a Web crawler or the like which autonomously traverses the Web to cull Hidden Web pages from one or more Websites known to have hidden content contained therein. The system and method preferably generates or otherwise prepares an index of the discovered Hidden Web pages such that conventional search engines are able to access the hidden content. For example, content that was previously hidden from a user searching the Internet with a search engine is no longer hidden. A search performed through a conventional search engine will now produce an index or list of "hits" that contain Hidden Web pages that was heretofore "invisible" to search engines.

The system and method described herein will allow a user searching the Web to more easily explore the vast quantity of information that is mostly "hidden" from view. Because most users search the Web use conventional search engines, "hidden" Web pages are not accessible because the pages are not indexed. Instead, a user must access the content via site-specific search interfaces which require additional input and searching. Many users, however, would like to use a single search interface such as that provided by a search engine to perform a single search rather than multiple searches across a number of site-specific search interface platforms. There thus is a need for a way to integrate Hidden Web content into existing search engine databases.

In addition, the system and method described herein is able to reduce the potential bias introduced by search engines. When a search is performed using a conventional search engine, a results list is generated and displayed to the user. However, the results list does not necessarily reflect what actually exists on the Web. Rather, the results list may be limited to those Web pages that are able to be indexed by the search engine. Moreover, the results list may include paid search listings or other information displayed more prominently that bias the results displayed to the user. The system and method described herein will make a larger fraction of the Web accessible through search engines, thereby mitigating bias that may be introduced by the search engine.

In one aspect of the invention, a method is provided for autonomously downloading and indexing Hidden Web pages from Websites having site-specific search interfaces. The method may be implemented using a crawler program or the like to cull Hidden Web content. The method includes the steps of selecting a query term and issuing a query to a site-specific search interface containing Hidden Web pages. The first query may be initiated using a seed term, for example, that may exist on the page containing the site-specific search interface. A results index is then acquired and the Hidden Web pages are downloaded from the results index. A plurality of potential query terms are then identified from the downloaded Hidden Web pages. The efficiency of each potential query term is then estimated and a next query term is selected from the plurality of potential query terms, wherein the next selected query term has the greatest efficiency. The next selected query term is then issued to the site-specific search interface. The method is an iterative process that repeats itself for a number or cycles, with each cycle resulting in a new query term chosen based on its projected efficiency. The method may also include the step of creating an index of each downloaded Hidden Web page.

The method and system described herein may be used on Websites having either a single-attribute search interface or a multi-attribute search interface. In the case of a multi-attribute search interface, potential keywords may be identified for each attribute of the search interface.

In one aspect of the invention, the process is repeated until all the Hidden Web documents are downloaded. In another aspect of the invention, the process is repeated until the number of new documents returned for one or more queries falls below a pre-set threshold.

In one aspect of the invention, the efficiency of each potential query term is expressed as a ratio of number of new documents returned for the potential query term to the cost associated with issuing the potential query. In another aspect of the invention, the efficiency of each potential query term is a function of the number of new documents returned for a particular query term.

In another aspect of the invention, the number of new pages returned ($P_{new}(q_i)$) for a particular query ($q_i$) is equal to $P(q_i) - P(q_1 \cup \ldots \cup q_{i-1}) P(q_i | q_1 \cup \ldots \cup q_{i-1})$ where $P(q_i)$ represents the fraction of pages returned for a particular query ($q_i$).

In another aspect of the invention, the cost of issuing the particular query is equal to $c_q + c_r P(q_i) + c_d P_{new}(q_i)$ where $P(q_i)$ represents the fraction of pages returned for a particular query ($q_i$) and $P_{new}(q_i)$ represents the fraction of new pages returned for a particular query ($q_i$), and where $c_q$ represents the cost of submitting the particular query, $c_r$ represents the cost of retrieving a results index page, and $c_d$ represents the cost for downloading a matching document.

In another aspect of the invention, a system for downloading Hidden Web pages includes a Web crawler for issuing a plurality of queries to one or more site-specific search interfaces containing Hidden Web pages. The Web crawler downloads the Hidden Web pages in response to the queries. The terms used in the queries are obtained from the downloaded Web pages. The system includes a computer configured to apply an algorithm to estimate the efficiency of each potential query term, wherein for each query, the most efficient query term is issued to the site-specific search interface by the Web crawler.

In still another aspect of the invention, the system stores an index of each downloaded Hidden Web page. The system may include a search engine having associated therewith an index of Web pages, wherein at least some of the indexed Web pages are Hidden Web pages.

BRIEF DESCRIPTION OF THE DRAWINGS

FIG. 6A illustrates a query statistics table for maintaining count tabulations.

FIG. 6B illustrates a query statistics table for maintaining count tabulations.

FIG. 6C illustrates a query statistics table for maintaining count tabulations.

DETAILED DESCRIPTION OF THE INVENTION

Figure 1:
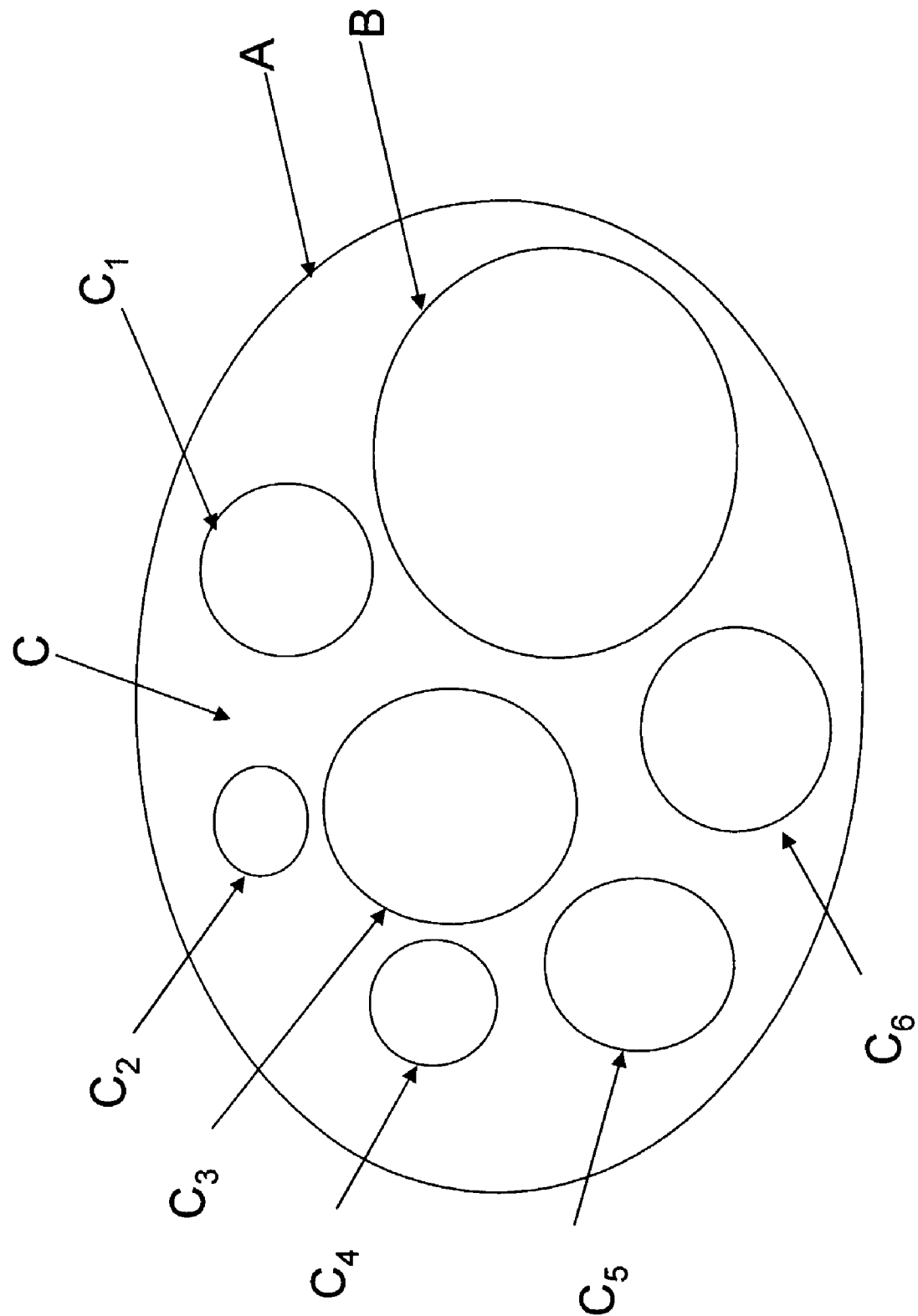
FIG. 1 illustrates a graphic representation of the Web in general, including the visible (accessed by following links) and the Hidden Web.

FIG. 1 graphically illustrates the problem posed by the Hidden Web. Area A in FIG. 1 represents the total amount or universe of Web pages that are potentially viewable on the World Wide Web (WWW). A smaller subset of the total universe of Web pages, represented by area B in FIG. 1, is actually searchable via traditional search engines. Conventional searches are able to discover Web pages in area B because these pages are indexed by search engines. For example, Web pages in area B are so-called static Web pages that contain or are linked through hyperlinks, thereby allowing conventional crawlers to index the pages for subsequent searching. A larger area within the overall universe A, represented by area C, constitutes the so-called Hidden or Deep Web. Web pages in area C are invisible or hidden from users searching the Web using conventional search engines. These pages are hidden from view behind site-specific search interfaces. Traditional search engines are unable to find these Web pages because, for example, the pages are not static but are instead dynamically generated or simply that the Web pages are not interconnected via hyperlinks that conventional crawlers can follow.

FIG. 1 illustrates six exemplary subsets ($C_1, C_2, C_3, C_4, C_5, C_6$) of Hidden Web information. In order to access these Web pages, a user has to visit each site and input a query into its site-specific search interface. Moreover, any one search likely only returns a small number of documents from a particular subset. The present method and apparatus described herein is able to cull or retrieve all or nearly all of the Web pages contained in the Hidden Web (e.g., $C_1$, $C_2$, $C_3$, $C_4$, $C_5$, $C_6$, etc.) and make this information available to users via conventional search engines.

Figure 2A:
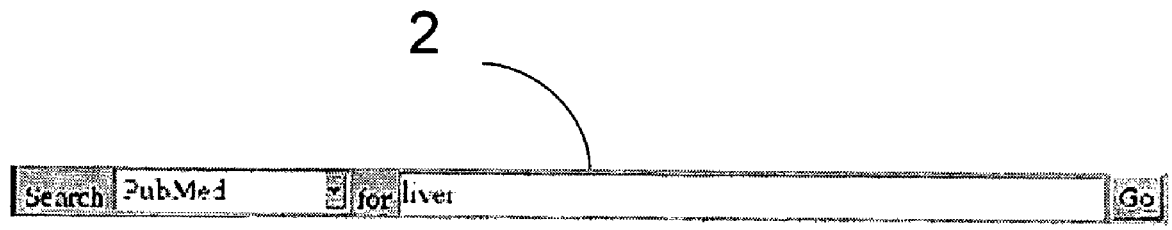
FIG. 2A illustrates a single-attribute search interface (e.g., PubMed).
Figure 2B:
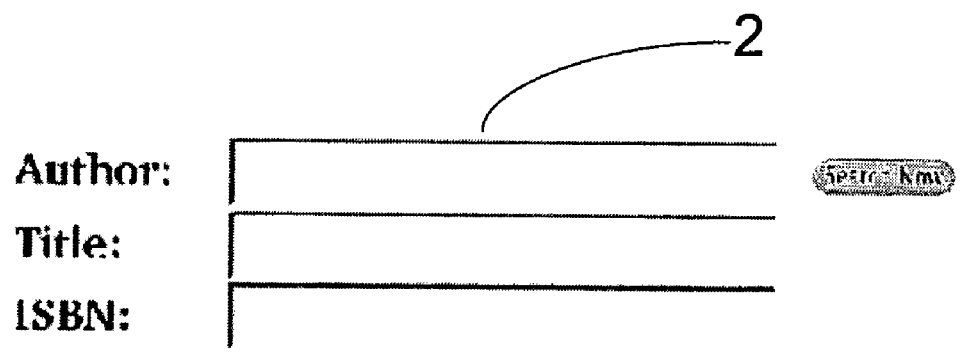
FIG. 2B illustrates a multi-attribute search interface (e.g., Amazon.com)

FIG. 2A illustrates a site-specific search interface 2 for accessing Hidden Web content (e.g., PubMed). The search interface 2 in FIG. 2A is referred to as a single-attribute search interface 2 due to the single search box. In contrast, FIG. 2B illustrates a site-specific search interface 2 for accessing Hidden Web content that is a multi-attribute search interface. For example, a Website that sells books may have a search interface 2 that includes search fields for Author, Title, and ISBN (International Standard Book Number). The present invention may be used with either a single-attribute search interface 2 or a multi-attribute search interface 2.

Figure 3:
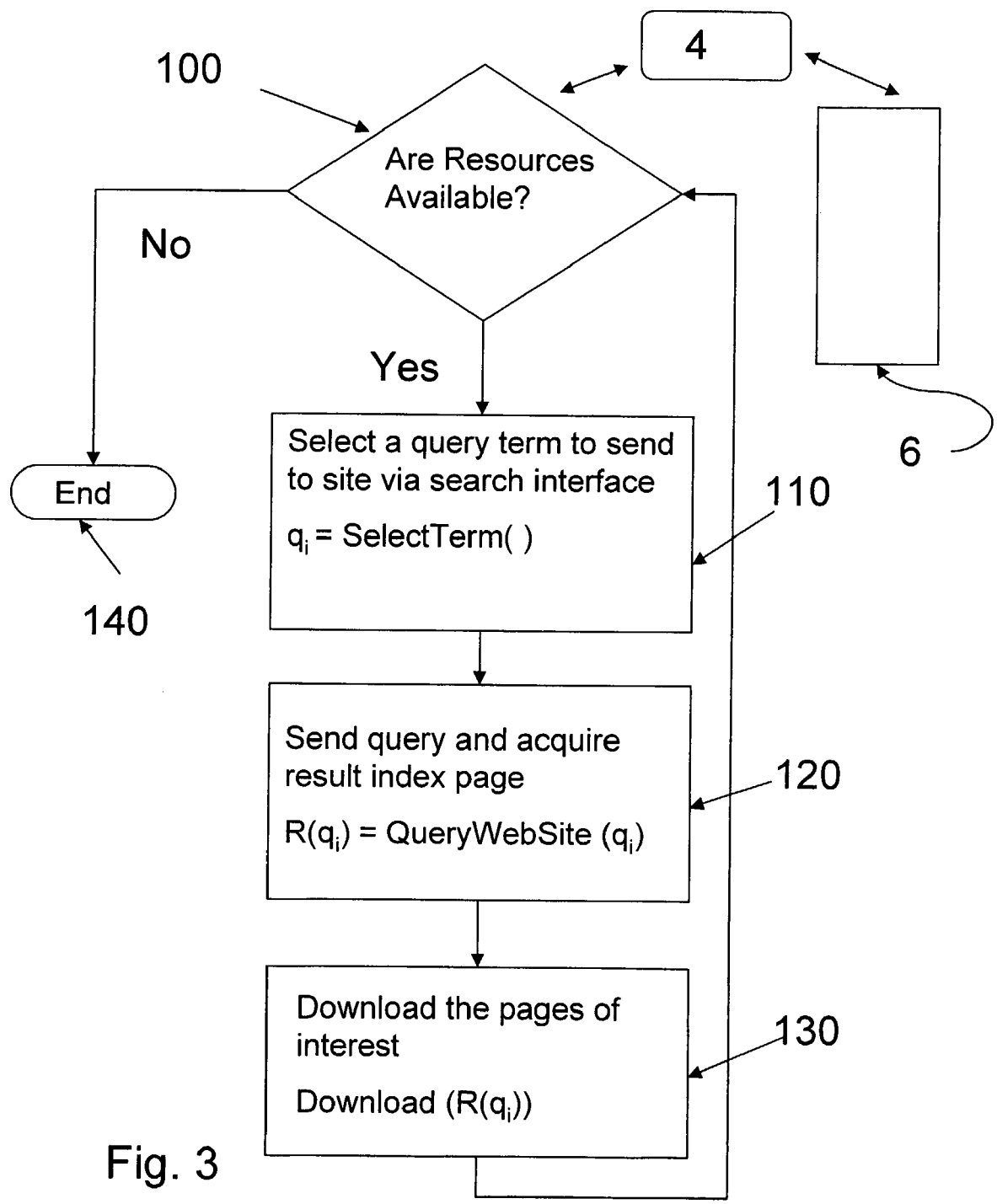
FIG. 3 illustrates a generic algorithm of pseudo-code for accessing Hidden Web content.

FIG. 3 illustrates a generic algorithm of pseudo-code for accessing Hidden Web content. In a preferred aspect of the invention, the algorithm is implemented using a software program in the form of a crawler 4, spider, or bot (referred to herein generically as crawler 4) run from one or more computers 6. The crawler 4 is first directed to the search interface 2 for the Website containing Hidden Web pages. In step 110, the crawler 4 selects a query term (e.g., a keyword) to send to the site via the search interface 2. In step 120, the crawler 4 issues the query to the search interface 2 and retrieves the result index page (or pages). Next, in step 130, the crawler 4 downloads the Hidden Web pages based on the result index page(s). Steps 110, 120, and 130 are repeated until all available resources are used up or meet a threshold limit (as shown in step 100) and the process ends (step 140). Alternatively, the process may end when the crawler 4 downloads all or a significant portion of the Hidden Web pages. For example, the crawler 4 may stop when it determines that the number of new or unique Hidden Web pages returned for one or more queries falls below a pre-set, threshold value.

With reference to the algorithm in FIG. 3, of great importance is the decision by the crawler 4 of what query term to issue next. If the crawler 4 can issue successful or relevant queries that will return the largest number of Web pages, the crawler 4 can finish the process relatively early thereby minimizing its use of resources. In contrast, if the crawler 4 issues unsuccessful queries that few or no Web pages, it may waste all of its resources without retrieving many (or any at all) relevant Web pages. Therefore, the manner in which the crawler 4 determines what query to run next directly affects the effectiveness of the crawling algorithm.

Figure 4:
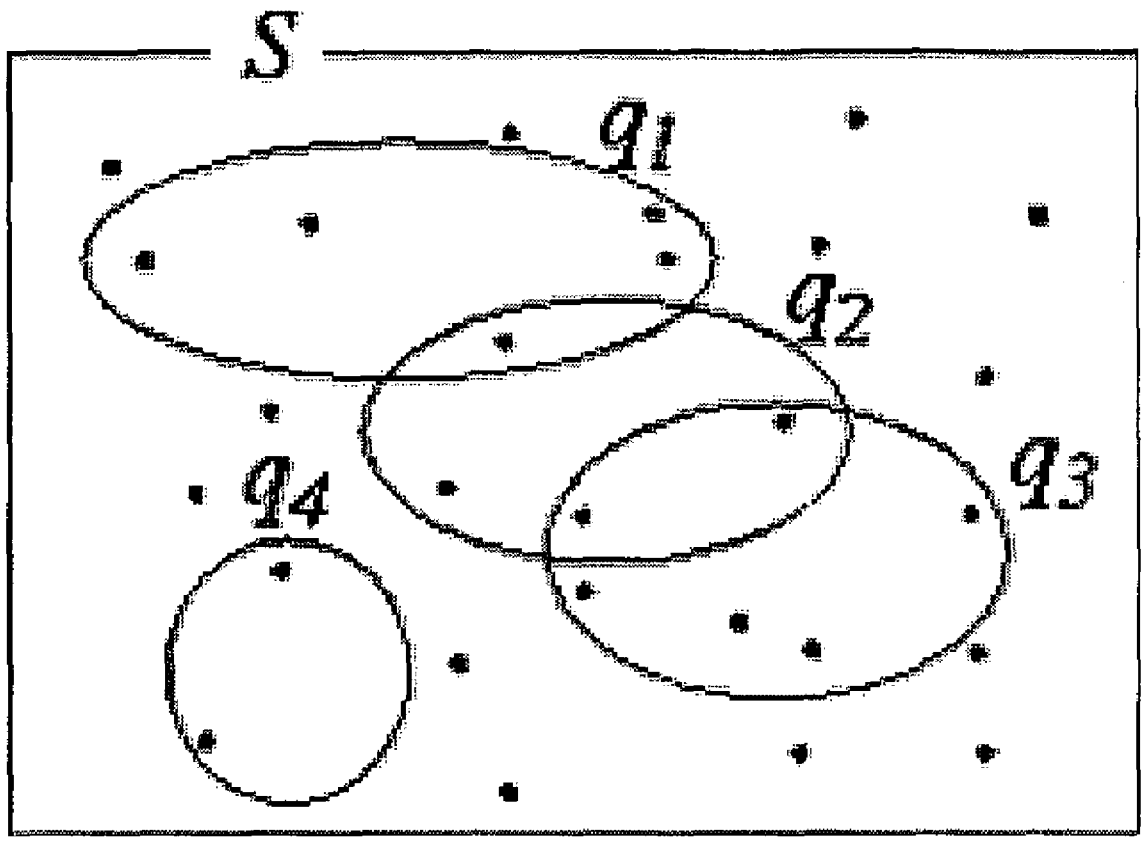
FIG. 4 illustrates a set-formalization of the optimal query selection problem.

On a theoretical level, the problem of query selection is similar to the set-covering problem in graph theory. FIG. 4 illustrates a set-formalization of the optimal query selection problem. As seen in FIG. 4, the crawler 4 downloads pages from a Website that has a set of pages S. Each Web page within the set of pages S is represented as a dot or point. Every potential query $q_i$ that may be issued by the crawler 4 may be viewed as a subset of S containing all the points (i.e., Web pages) that are returned when the particular query term $q_i$ is issued to the site (e.g., $q_1$, $q_2$, $q_3$, $q_4$). Each subset is then associated with a weight or cost that represents the overall cost of issuing the particular query. Under this formalization, the goal of the crawler 4 is to find which subsets (i.e., queries, $q_i$) cover the maximum number of points (i.e., Web pages) with the minimum total cost.

There are, however, two primary difficulties with this problem. First, in a real-world situation, the crawler 4 does not know which Web pages will be returned by any particular query so the subsets of S (in FIG. 4) are not known in advance. Without knowing the subsets of S prior to performing the search, the crawler 4 is unable to decide which queries will produce the maximum returns (i.e., coverage of S). Second, the set-covering formalization is known to be NP-Hard, so an efficient algorithm to solve this problem in polynomial time has yet to be found.

In one aspect of the invention, the above-identified problems are overcome by using an approximation algorithm that is able to find a near-optimal solution at a reasonable resource (e.g., computational or other resource) cost. The algorithm is based on the fact that while one cannot determine a priori which Web pages will be returned by each query $q_i$ that is issued, the method is able to predict how many Web pages will be returned. Based on this information, the algorithm is able to select the quasi-optimum or "quasi-best" queries that cover the particular content of the Website of interest.

In one aspect of the invention, the algorithm is best understood in terms of cost and performance metrics. Given a particular query $q_i$, $P(q_i)$ represents the fraction of Web page that will be returned by issuing a particular query $q_i$ to the site. For instance, if a Website has 10,000 Hidden Web pages in total and if 3,000 Web pages are returned for the query where $q_i$="medicine," then $P(q_i)$=0.3. The intersection of $P(q_1)$ and $P(q_2)$ ($P(q_1 \cap q_2)$) represents the fraction of pages that are returned from both $q_1$ and $q_2$. Similarly, the union of $P(q_1)$ and $P(q_2)$ ($P(q_1 \cup q_2)$) represents the fraction of pages that are returned from either $q_1$ or $q_2$.

With respect to the cost component of the algorithm, Cost ($q_i$) is used to represent the cost of issuing the query $q_i$. Depending on the particular scenario, the cost may be measured, for example, in time, network bandwidth, the number of interactions with the site, or a combination or sub-combination of these components. Generally, the algorithm used in accordance with the present invention is independent of the exact cost function.

In a typical search, the query cost consist of a number of factors including the cost for submitting the query to the site, the cost for retrieving the result index page, and the cost associated with downloading the actual Hidden Web pages. Assuming that a particular query incurs a fixed cost of $c_q$, the cost for downloading the result index page ($c_r$) is proportional to the number of matching documents to the query. Similarly, the cost ($c_d$) for downloading matching documents is also fixed. The overall cost of a particular query $q_i$ may be represented by Equation 1 below:

$$\text{Cost}(q_i) = c_q + c_r P(q_i) + c_d P(q_i) \quad (1)$$

In many cases, however, some of the Web pages returned from $q_i$ may have already been downloaded from previous queries. In this case, the crawler 4 may skip downloading these documents. Consequently, the cost of $q_i$ may be represented by Equation 2 below where $P_{new}(q_i)$ represents the fraction of new (i.e., unique) documents returned from $q_i$ that have not been returned from prior queries:

$$\text{Cost}(q_i) = c_q + c_r P(q_i) + c_d P_{new}(q_i) \quad (2)$$

As explained in more detail below, $P(q_i)$ and $P_{new}(q_i)$ may be estimated to estimate the cost of $q_i$. Generally, since the algorithm employed to download Hidden Web pages is independent of the exact cost function, a generic cost function may be assumed ($\text{Cost}(q_i)$). However, when a concrete cost function is needed, cost function in Equation 2 may be employed. Given this, the goal of the crawler 4 may be identified as follows:

Find the set of queries $q_1, \ldots, q_n$ that maximizes:

$$P(q_1 \cup \ldots \cup q_n) \quad (3)$$

Under the constraint:

$$\sum_{i=1}^{n} \text{Cost}(q_i) \leq t \quad (4)$$

Where t is the maximum download resource that the crawler 4 has available to it.

Given that the goal of the crawler 4 is to download the maximum number of unique Web pages (e.g., documents) from a textual database, the crawler 4 needs to efficiently select a "next" query to issue to the Website. For example, the crawler 4 may select random keywords from, for instance, an English dictionary and issue them to the site-specific search interface 2 (i.e., a random algorithm). Alternatively, a generic document corpus collected elsewhere (e.g., from the Web) may be obtained and a generic frequency distribution of each keyword may be obtained. Based on the generic distribution, the search may begin with the most frequent keyword. A second search could be performed with the second most frequent keyword and so on and so forth until the all download resources are exhausted (i.e., a generic-frequency algorithm). In still another alternative, the Web pages returned from the previous queries issued to the site-specific search interface 2 containing the Hidden Web pages are analyzed and an estimate is made of which keyword is most likely to return the most number of unique Web pages. Based on this estimate, the most promising keyword or term is issued to the site-specific search interface 2. The process is repeated, wherein after each new search, the most desired or optimum search term is determined and then issued to the search interface 2.

The present invention is directed to this last option, namely, the method relies on an adaptive algorithm that identifies the most promising query based on the keywords or terms identified in Hidden Web pages in prior queries. The random algorithm may be considered as the base comparison or control since this algorithm is expected to perform the worst of the three algorithms discussed above.

With respect to the adaptive algorithm, in order to identify the most promising "next" query, the number of estimated unique Hidden Web pages or documents that will be downloaded if a next query $q_i$ is issued to a site-specific search interface 2 needs to be estimated. More specifically, assuming that queries $q_1, \ldots, q_{i-1}$ have been issued, $P(q_1 \cup \ldots \cup q_{i-1} \cup q_i)$ needs to be estimated for every potential next query. In estimating this number, $P(q_1 \cup \ldots \cup q_{i-1} \cup q_i)$ may be rewritten as:

$$P(q_1 \cup \ldots \cup q_{i-1}) + P(q_i) - P((q_1 \cup \ldots \cup q_{i-1}) \cap q_i) \quad (5)$$

Which is equal to:

$$P(q_1 \cup \ldots \cup q_{i-1}) + P(q_i) - P(q_1 \cup \ldots \cup q_{i-1}) P(q_i | q_1 \cup \ldots \cup q_{i-1}) \quad (6)$$

In Equation 6 above, $P(q_1 \cup \ldots \cup q_{i-1})$ and $P(q_i | q_1 \cup \ldots \cup q_{i-1})$ can be precisely measured by analyzing previously-downloaded pages. First, the union of all Web pages downloaded from $q_1, \ldots, q_{i-1}$ is already known (i.e., $P(q_1 \cup \ldots \cup q_{i-1})$) because the crawler 4 has already issued terms for $q_1, \ldots, q_{i-1}$ and downloaded the resulting Web pages. In addition, the probability that $q_i$ appears in the Web pages from $q_1, \ldots, q_{i-1}$ (i.e., $P(q_i | q_1 \cup \ldots \cup q_{i-1})$) can be measured by counting how many times that $q_i$ appears in the pages from $q_1, \ldots, q_{i-1}$. For example, a query statistics table may be repeatedly updated to efficiently compute this probability. Consequently, one only needs to estimate $P(q_i)$ to evaluate $P(q_1 \cup \ldots \cup q_i)$.

$P(q_i)$ may be estimated using any known techniques. For example, using an independence estimator, one can assume that the appearance of the term $q_i$ is independent of the terms $q_1, \ldots, q_{i-1}$. Consequently, it can be assumed that $P(q_i) = P(q_i \cup q_1 \cup \ldots \cup q_{i-1})$. Alternatively, the Zipf estimator technique is able to estimate how many times a particular term occurs in the entire corpus based on a smaller subset of documents from the larger corpus. This method exploits the fact that the frequency of terms inside text collections follows a power law distribution. Thus, if all terms are ranked based on their occurrence frequency (with the most frequent term having a rank of 1, second most frequent having a rank of 2), then the frequency f of a term inside the collection is given by Equation 7 below:

$$f = \alpha(r+\beta)^{-\gamma} \quad (7)$$

Where r is the rank of the term and $\alpha$, $\beta$, and $\gamma$ are constants that depend on the text collection. The general idea behind the Zipf estimator technique is to estimate the three parameters $\alpha$, $\beta$, and $\gamma$ based on the subset of documents (i.e., Web pages) that have been downloaded from previous queries. The estimated parameters are then used to predict the frequency f given the ranking r of a term within the subset. This frequency can thus be used to estimate $P(q_i)$. After estimating the values for $P(q_i)$ and $P(q_i | q_1 \cup \ldots \cup q_{i-1})$ the value for $P(q_1 \cup \ldots \cup q_i)$ can then be estimated.

As stated above, the goal of the algorithm implemented by the crawler 4 is to download the maximum number of unique Hidden Web pages from a database using its limited download resources. Thus, the crawler 4 should select query terms that maximize search efficiency of the collection of Hidden Web pages. In one preferred aspect of the invention, the crawler 4 determines subsequent query terms based on (1) the number of new documents that can be obtained from the query $q_i$, and (2) the cost of issuing the query $q_i$. For example, if two queries, $q_i$ and $q_j$, incur the same cost, but $q_i$ returns more unique Web pages than $q_j$, then $q_i$ is more desirable than $q_j$. Conversely, if $q_i$ and $q_j$ return the same number of new Web pages, but $q_i$ incurs less cost than $q_j$, then $q_i$ is more desirable. Consequently, the crawler 4 may use an efficiency metric based on the ratio in Equation 8 shown below to quantify the desirability of a particular search term $q_i$.

$$\text{Efficiency}(q_i) = \frac{P_{new}(q_i)}{\text{Cost}(q_i)} \quad (8)$$

Figure 5:
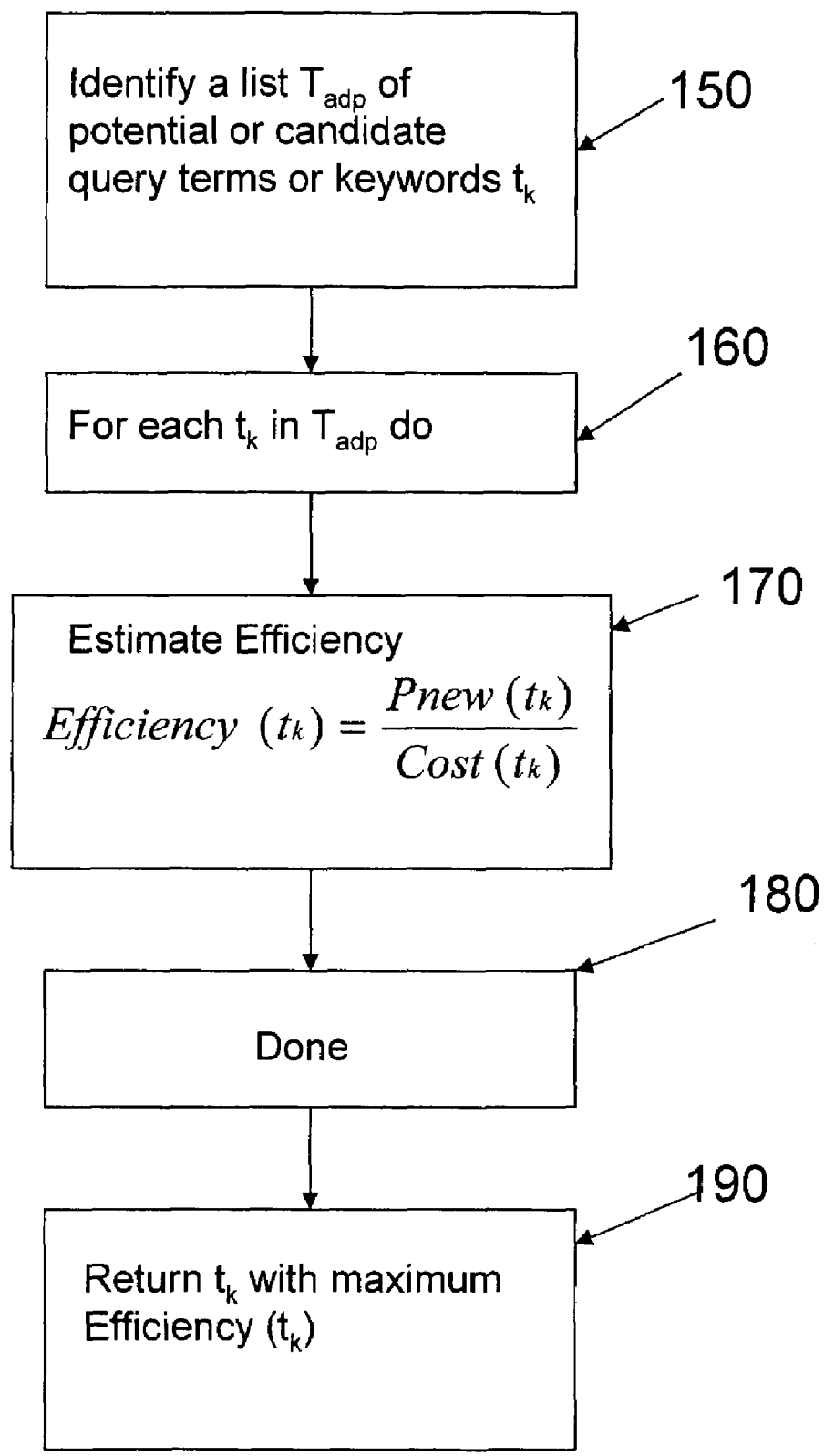
FIG. 5 illustrates an algorithm or pseudo-code for selecting a next query term based on the term's estimated efficiency.

In Equation 8, $P_{new}(q_i)$ represents the amount of new Web pages (e.g., documents or files) returned for a particular query $q_i$. In addition, $\text{Cost}(q_i)$ represents the cost of issuing the query $q_i$. Generally, the efficiency of a particular query $q_i$ measures how many new or unique Web pages are retrieved per unit cost and can be used as an indicator or proxy of how well resources are spend when issuing a particular query $q_i$. In a preferred aspect of the invention, the crawler 4 can estimate the efficiency of every candidate or potential search query term $q_i$ and select the one with the highest value. FIG. 5 illustrates an algorithm or pseudo-code for selecting a next query term based on the term's estimated efficiency.

As seen in FIG. 5, in step 150 a listing $T_{adp}$ of potential or candidate query terms or keywords $t_k$ is extracted based on the terms contained in previously downloaded Hidden Web pages. For each potential query term or keyword $t_k$ in $T_{adp}$ (step 160) the efficiency is determined (step 170) based on the ratio of the number of new pages returned $P_{new}(t_k)$ for a particular query $t_k$ to the cost $\text{Cost}(t_k)$ of issuing the particular query. After the efficiency is determined for each of the plurality of candidate query terms, the process is stopped (step 180) and the search term with the highest or maximum efficiency is returned for input to the site-specific search interface 2 (step 190).

The efficiency of every potential query using the estimation method described above may be used. Specifically, the size of new or unique documents form the query $q_i$, $P_{new}(q_i)$ is set forth below in Equations 9 and 10.

$$P_{new}(q_i) = P(q_1 \cup \ldots \cup q_{i-1} \cup q_i) - P(q_1 \cup \ldots \cup q_{i-1}) \quad (9)$$

$$\text{Or } P_{new}(q_i) = P(q_i) - P(q_1 \cup \ldots \cup q_{i-1}) P(q_i | q_1 \cup \ldots \cup q_{i-1}) \quad (10)$$

As stated above, $P(q_i)$ may be estimated using, for example, the independence estimator technique or the Zipf estimator technique. In a similar manner, $\text{Cost}(q_i)$ may be estimated. For example, if $\text{Cost}(q_i)$ is represented by Equation 11 below, $\text{Cost}(q_i)$ may be estimated by estimating $P(q_i)$ and $P_{new}(q_i)$:

$$\text{Cost}(q_i) = c_q + c_r P(q_i) + c_d P_{new}(q_i) \quad (11)$$

As seen in Equation 10 above, in estimating the efficiencies of potential queries, there is a need to measure $P(q_i | q_1 \cup \ldots \cup q_{i-1})$ for every potential query $q_i$. This calculation, however, can be very time-consuming if the calculation is repeated from scratch for every query $q_i$, in every iteration of the algorithm. In one preferred aspect of the invention, $P(q_i | q_1 \cup \ldots \cup q_{i-1})$ may be computed efficiently by maintaining and updating a query statistics table 200. The query statistics table 200 permits $P(q_i | q_1 \cup \ldots \cup q_{i-1})$ to be measured by counting how many times the term or keyword $q_i$ appears within Web pages or documents downloaded from $q_i, \ldots, q_{i-1}$. The count tabulations are maintained in a query statistics table 200, for example, of the type disclosed in FIGS. 6A, 6B, and 6C. As seen in FIG. 6A, the left most column of the query statistics table 200 contains all previously-downloaded terms or keywords contained in the downloaded Hidden Web pages. The right side of the query statistics table 200 contains a count of the number of previously downloaded Web pages or documents containing the respective terms or keywords. For example, with reference to FIG. 6A, the query statistics table 200 shows that the crawler 4 has downloaded a total of 50 Web pages (or documents) so far and the term "model" appears in 10 of the Web pages, the term "computer" appears in 38 of the Web pages, and the term "digital" appears in all (or 50) of the Web pages. In this example, the prior search term or keyword may have been "digital" since each Web page returned included this term. $P(q_i | q_1 \cup \ldots \cup q_{i-1})$ may be computed by calculating a ratio. For instance, in the table shown in FIG. 6A, $$P(\text{model} | q_l \cup \ldots \cup q_{i-l}) = \frac{10}{50} = 0.2.$$

The query statistics table 200 needs to be updated whenever the crawler 4 issues a new query $q_i$ and downloads additional documents.

With reference to FIGS. 6A, 6B, and 6C, a description will be given of how the query statistics table 200 can be used to determine the probability that $q_i$ appears in the downloaded Hidden Web pages (or documents) from $q_1, \ldots, q_{i-1}$. After examining the query statistics table 200 in FIG. 6A, assume that the crawler 4 determines to use the term "computer" as the next query $q_i$. From the new query $q_i$="computer," the crawler 4 downloaded 20 more new Web pages. Out the 20 unique or new Web pages, 12 contain the term or keyword "model" and 18 contain the term or keyword "disk." FIG. 6B illustrates that updated table which includes the frequency of each term or keyword in the newly downloaded Web pages. FIG. 6C illustrates an updated query statistics table 200 that adds the corresponding entries of the table shown in FIGS. 6A and 6B. For example, with reference to FIG. 6C, the term or keyword "model" occurs in 10+12=22 Web pages within the pages retrieved from $q_1, \ldots, q_i$. According to the updated query statistics table 200 in FIG. 6C, $$P(\text{model} | q_l \cup \ldots \cup q_i) = \frac{22}{70} = 0.3.$$

In certain Websites, when a query issued by the crawler 4 matches a large number of Web pages, only a small subset or portion is returned to crawler 4. For example, the Open Directory Project allows users to see only up to 10,000 results after a query has been issued. This truncation of the search results impacts the crawler 4 in several ways. First, because the crawler 4 can only retrieve up to a specific number of Web pages per query, the crawler 4 will need to issue more queries which may use up additional resources in order to download the Web pages. Second, the query selection method described herein assumes that for every potential query $q_i$, the crawler 4 will find $P(q_i | q_1 \cup \ldots \cup q_{i-1})$ or the fraction of Web pages in the whole database that contains $q_i$ with at least one of $q_1, \ldots, q_{i-1}$. However, if the database returned only a portion of the results for any of the $q_1, \ldots, q_{i-1}$ then the value of $P(q_i | q_1 \cup \ldots \cup q_{i-1})$ is not accurate and may affect the determination of the next query term or keyword and, potentially, the performance of the crawler 4. Because the crawler 4 cannot retrieve more than the maximum number of results than the Website allows, the crawler 4 has no other choice but to submit additional queries.

Figure 7:
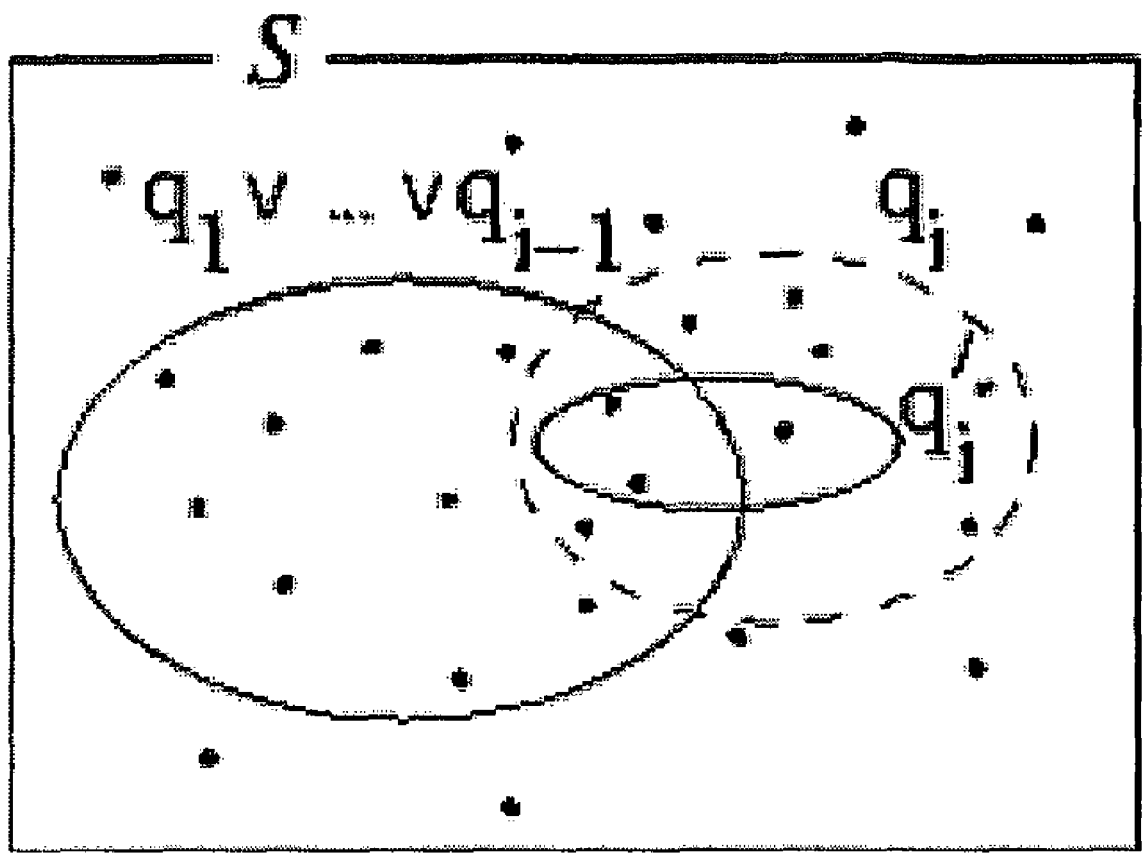
FIG. 7 graphically illustrates a Website that does not return all the results of a particular query.

There is, however, a way to estimate the correct value of $P(q_i|q_1 \cup \ldots \cup q_{i-1})$ in the case where the Website returns only a portion of the search results. FIG. 7 illustrates a Website that does not return all the results of a particular query. The rectangle S represents the Website that is being crawled while the individual Web pages are represented as dots or points. FIG. 7 assumes that the crawler 4 has already issued queries $q_1, \ldots, q_{i-1}$ which returned a number of results less than the maximum number that the site permits. Consequently, the crawler 4 downloads all the Web pages for these queries which is represented by the large oval in FIG. 7. At this point during the process, the estimation of $P(q_i|q_1 \cup \ldots \cup q_{i-1})$ is accurate. However, if a next query $q_i$ is submitted to the Website, the Website returns the set $q_i'$ (shown by small solid-lined oval in FIG. 7) instead of the set $q_i$ (larger dashed oval in FIG. 7). The smaller set $q_i'$ may be returned, for example, due to limitations on the number of returned results for this particular Website. In this example, the query statistics table 200 needs to be updated to accurately reflect the term or keyword frequency data used in the next query step. Specifically, although the Website returned $q_i'$ for every potential query $q_{i+1}$ the crawler needs to find $P(q_{i+1}|q_1 \cup \ldots \cup q_i)$. This may be determined in accordance with Equation 12 below:

$$P(q_{i+1}|q_l \cup \ldots \cup q_i) = \qquad (12)$$
$$\frac{1}{P(q_1 \cup \ldots \cup q_i)}[P(q_{i+1} \cap (q_l \cup \ldots \cup q_{i-1})) +$$
$$P(q_{i+1} \cap q_i) - P(q_{i+1} \cap q_i \cap (q_l \cup \ldots \cup q_{i-1}))]$$

In Equation 12, $P(q_1 \cup \ldots \cup q_i)$ can be found by estimating $P(q_i)$ as describe above. In addition, $P(q_{i+1} \cap (q_1 \cup \ldots \cup q_{i-1}))$ and $P(q_{i+1} \cap q_i \cap q_1 \cup \ldots \cup q_{i-1}))$ may be determined by directly examining the Web pages that have been downloaded by the crawler 4 from queries $q_1, \ldots, q_{i-1}$. The term $P(q_{i+1} \cap q_i)$ is unknown and needs to be estimated. Assuming that $q_i'$ is a random sample of $q_i$, then:

$$\frac{P(q_{i+1} \cap q_i)}{P(q_{i+1} \cap q_i')} = \frac{P(q_i)}{P(q_i')} \qquad (13)$$

From Equation 13, $P(q_{i+1} \cap q_i)$ may be calculated and this value may be replaced into Equation 12 to yield $P(q_{i+1}|q_1 \cup \ldots \cup q_i)$.

Experiments were performed to evaluate the performance of three different algorithms implemented on the Web crawler 4. The algorithms or policies employed included a random algorithm, a generic-frequency algorithm, and an adaptive algorithm. In the random algorithm a corpus of documents consisting of 5.5 million Web pages were downloaded form 154 Websites of various topics. Search terms or keywords where then selected at random. In order to further investigate how the quality of the potential query term list affects the algorithm, two sets were constructed. A first set included the 16,000 most frequently used terms or words (referred to as random-16k). A second set included the 1,000,000 most frequently used terms or words (referred to as random-1M). The first set has frequent words or terms that appear in a large number of documents and therefore can be considered "high-quality" terms. The second set contains a much larger collection of terms or words, some of which are irrelevant or meaningless (e.g., "xxzyz").

In the generic-frequency algorithm, the frequency distribution of terms or keywords was computed from the same Web corpus used in the random algorithm. Terms or keywords were selected based on their decreasing frequency with which they appear in the document set with the most frequent term being selected first followed by the second-most frequent term, and so on and so forth. The algorithm did not exclude stop words from the keyword list (e.g., the, is, of, etc.).

The adaptive algorithm, which is the subject of the present invention, learned new keywords or terms in accordance with the selection process described herein. In particular, the crawler 4 identified and selected keywords or terms based on the efficiency metric based on the ratio in Equation 8. To make the experiment and analysis simple, a unit cost was chosen for every query. The goal was to return the maximum number of downloaded Web pages by issuing the fewest number of queries. During this experiment, the independence estimator method was used to estimate $P(q_i)$ from the downloaded Web pages.

The three algorithms were then used to crawl and download Hidden Web content from thee Websites having site-specific search interfaces. The Websites used in the experiments included the PubMed Medical Library (http://www.pubmed.org), Amazon.com (http://www.amazon.com), and the Open Directory Project (http://dmoz.org). With respect to the PubMed Website, its collection includes approximately 14 million abstracts of articles in the medical and biomedical fields. The abstracts were considered to be hidden "documents" contained within the site and were the source for each iteration of the adaptive algorithm described herein. The goal was to discover as many unique abstracts as possible by repeatedly querying the site-specific search interface 2 of PubMed. The PubMed Website is considered to be a topic-specific Website because the abstracts contained therein are within the fields of medicine and biology.

In the case of the Amazon.com Website, the crawler 4 is interested in downloading all the Hidden Web pages that contain information on books. The querying by the crawler 4 of the Amazon.com Website is performed through the Software Developer's Kit that Amazon provides for interfacing to its Website, and which returns results in XML form. In this experiment, the generic "keyword" field was used for searching, and as input. For the adaptive algorithm, terms or keywords were extracted from the product descriptions and the text accompanying customer reviews when present in the XML reply. Because Amazon.com does not provide any information on how many books it has in its catalogue, a random sampling was used on the 10-digit ISBN number of the books to estimate the size of the total collection. Out of 10,000 random ISBN numbers queried, 46 were found in the Amazon.com catalogue. Consequently, the size of its book collection was estimated to be $46/10,000*10^{10}=4.6$ million books. In addition, the Amazon.com Website imposes an upper limit on the number of results returned by each query, which was set to 32,000.

With respect to the third Hidden Website, the dmoz Open Directory Project, the site maintains hyperlinks to 3.8 million sites together with a brief summary of each listed site. The hyperlinks are searchable through a site-specific keyword search interface 2. Each indexed link together with its brief summary was considered as the "document" of the dmoz Website, and the short summaries were provided to the adaptive algorithm to drive the selection of new keywords for querying. On the dmoz Website, two different Hidden Web crawls were performed. The first was performed on the Website's generic collection of 3.8 million indexed sites, regardless of the category in which they fall into. The second crawl was performed specifically on only a subset of the overall database, namely, the Arts section of the dmoz Website (http://dmoz.org/Arts) which includes approximately 429,000 indexed sites that are relevant to arts, thereby making this crawl topic-specific as in PubMed. In addition, dmoz enforces an upper limit on the number of returned results, which is 10,000 links with their corresponding summaries.

Figure 8:
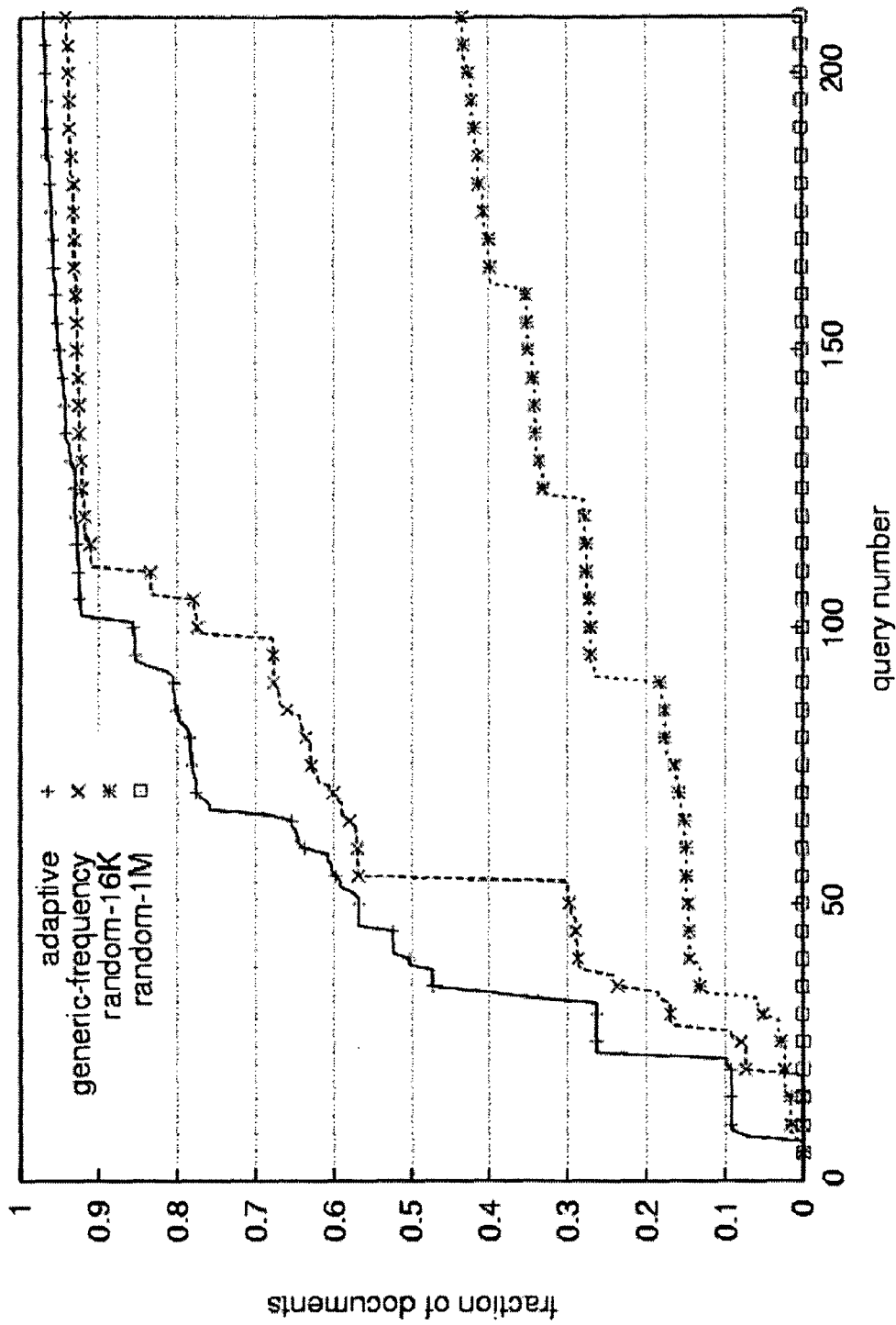
FIG. 8 is a graph illustrating the cumulative fraction of unique or new Web pages returned from the PubMed Website using the adaptive algorithm, the generic-frequency algorithm, and the random algorithm (both 16k and 1M).
Figure 9:
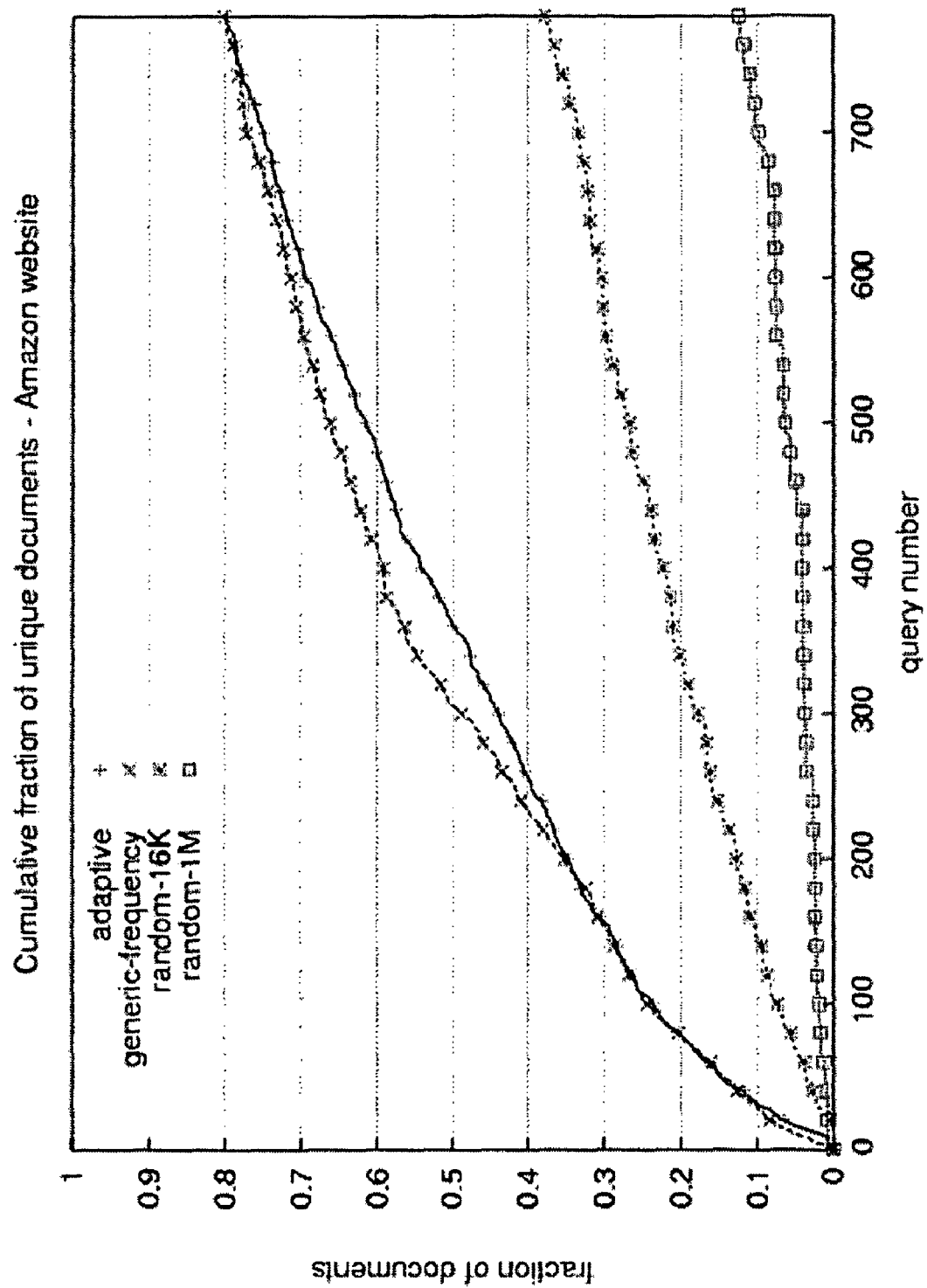
FIG. 9 is a graph illustrating the cumulative fraction of unique or new Web pages returned from the Amazon.com Website using the adaptive algorithm, the generic-frequency algorithm, and the random algorithm (both 16k and 1M).
Figure 10:
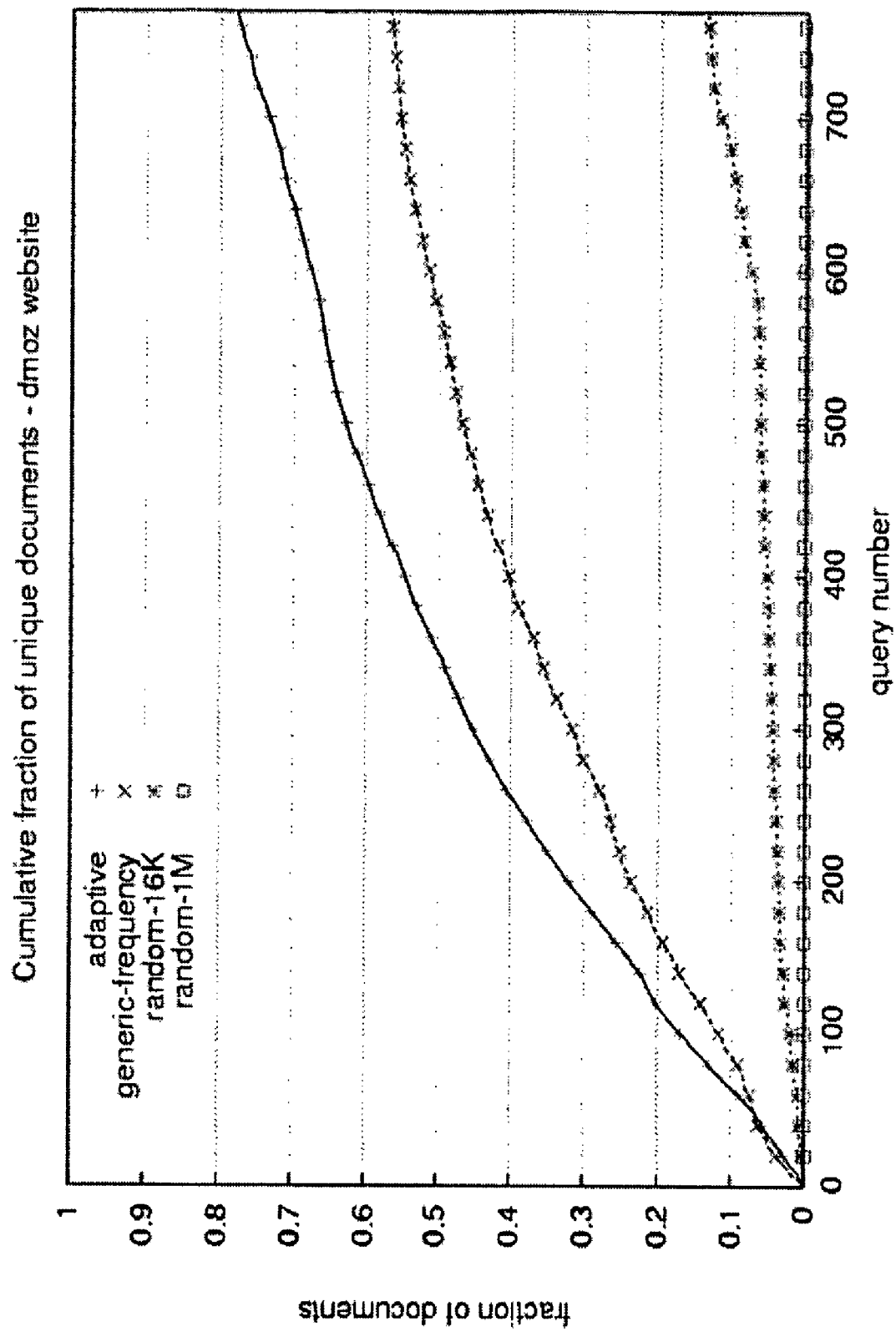
FIG. 10 is a graph illustrating the cumulative fraction of unique or new Web pages returned from the dmoz Website using the adaptive algorithm, the generic-frequency algorithm, and the random algorithm (both 16k and 1M).
Figure 11:
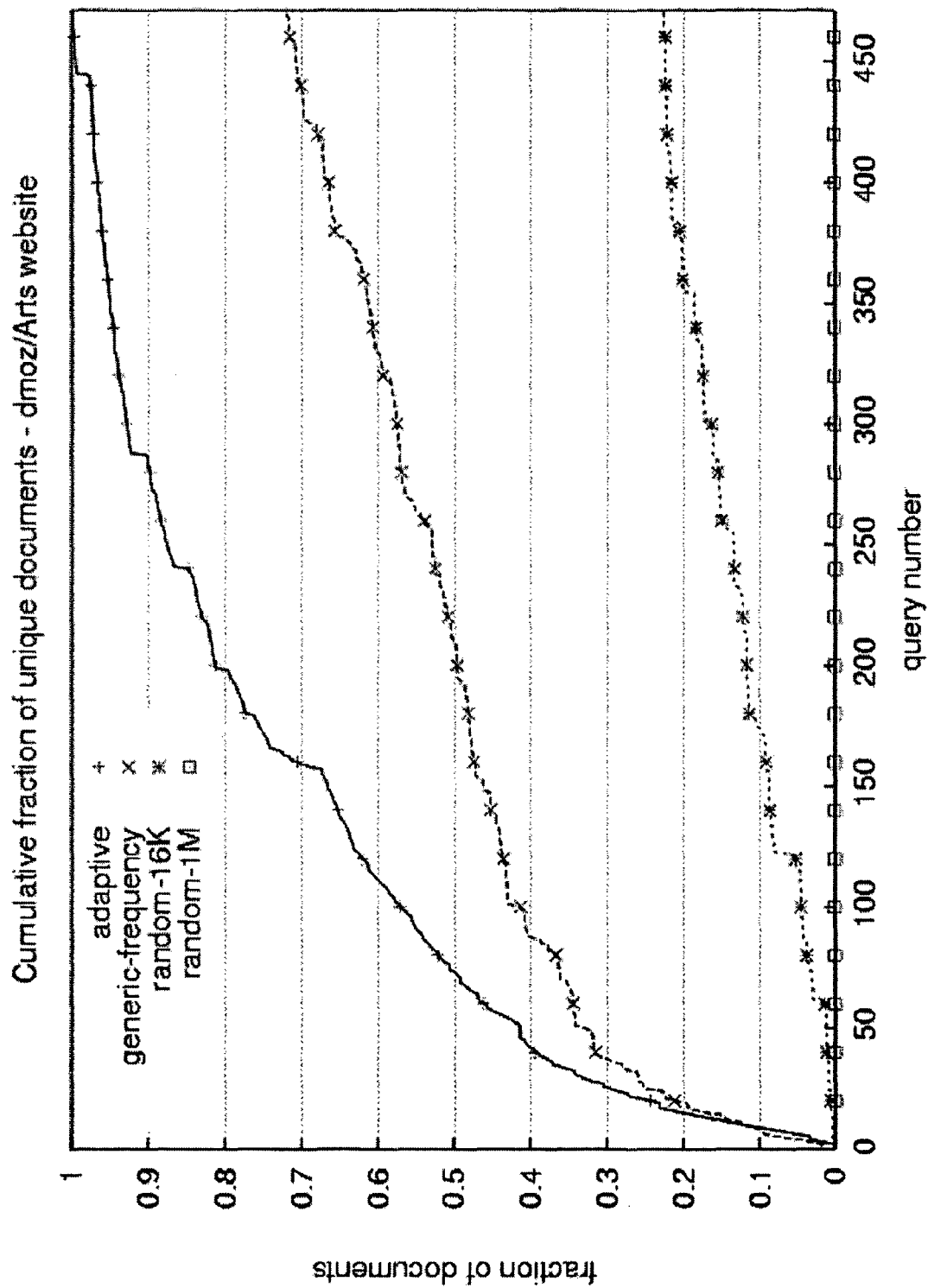
FIG. 11 is a graph illustrating the cumulative fraction of unique or new Web pages returned from the dmoz/Arts Website using the adaptive algorithm, the generic-frequency algorithm, and the random algorithm (both 16k and 1M).

FIGS. 8, 9, and 10 illustrate the evolution of the coverage metric as a function of the total number of queries that were issued to each Website. In particular, the coverage measures the fraction of the collection of "documents" stored as Hidden Web pages that can be downloaded with multiple queries using the algorithms described above. More formally, the coverage metric obtains the value of $P(q_1 \cup \ldots \cup q_{i-1} \cup q_i)$ after submitting $q_1, \ldots, q_i$ queries as i increases. FIG. 8 illustrates the coverage of the different algorithms for the PubMed Website. FIG. 9 illustrates the coverage of the different algorithms for the Amazon.com Website. FIG. 10 illustrates the coverage of the different algorithms for the dmoz Website. FIG. 11 illustrates the coverage of the Arts-specific section of the dmoz Website.

In FIGS. 8-11, the y-axis represents the fraction of the total documents downloaded from the Website, while the x-axis represents the query number. A first observation from the graphs is that in general, the generic-frequency and the adaptive policies perform much better than the random-based algorithms. In FIGS. 8-11, the graphs for the random-1M and the random-16K are significantly below those of other algorithms.

Between the generic-frequency and the adaptive algorithms, the latter algorithm outperforms the former when the site is topic-specific. For example, for the PubMed site (FIG. 8), the adaptive algorithm issues only 83 queries to download almost 80% of the documents stored in PubMed, but the generic-frequency algorithm requires 106 queries for the same coverage. For the dmoz/Arts crawl (FIG. 11), the difference is even more substantial: the adaptive policy is able to download 99.98% of the total sites indexed by issuing 471 queries, while the frequency-based algorithm is much less effective using the same number of queries, and discovers only 72% of the total number of indexed sites. The adaptive algorithm, by examining the contents of the Web pages that it downloads at each iteration, is able to identify the topic of the site as expressed by the words that appear most frequently in the result-set. Consequently, the adaptive algorithm is able to select words or terms for subsequent queries that are more relevant to the site than those preferred by the generic-frequency policy, which are drawn from a large, generic collection. Table 1 shown below illustrates a sample of 10 keywords out of 211 chosen and submitted to the PubMed Website by the adaptive algorithm, but not by the other algorithms. For each keyword, the number of the iteration is provided along with the number of results that were returned. As one can see from Table 1, these terms or keywords are highly relevant to the topics of medicine and biology of the Public Medical Library, and match against numerous hidden abstracts stored in the Website.

TABLE 1

| Iteration | Keyword or Term | Number of Results |
|---|---|---|
| 23 | Department | 2,719,031 |
| 34 | Patients | 1,934,428 |
| 53 | Clinical | 1,198,322 |
| 67 | Treatment | 4,034,565 |
| 69 | Medical | 1,368,200 |
| 70 | Hospital | 503,307 |
| 146 | Disease | 1,520,908 |
| 172 | Protein | 2,620,938 |
| 174 | Molecular | 951,639 |
| 185 | Diagnosis | 4,276,518 |

As seen in FIGS. 8 and 11, the random-based policies perform much worse than the adaptive algorithm and the generic-frequency. It is worthy noting however, that the random-based policy with the small, carefully selected set of 16,000 "quality" words manages to download a considerable fraction (42.5%) from the PubMed Website after 200 queries, while the coverage for the Arts section of dmoz reaches 22.7%, after 471 queried keywords. On the other hand, the random-based approach that makes use of the vast collection of 1 million words, among which a large number is irrelevant keywords, fails to download even a mere 1% of the total collection after submitting the same number of query words.

For the generic collections of Amazon.com and the dmoz sites, shown in FIGS. 9 and 10, respectively, mixed results were obtained. The generic-frequency algorithm shows slightly better performance than the adaptive algorithm for the Amazon.com Website (FIG. 9) while the adaptive method clearly outperforms the generic-frequency for the general dmoz site (FIG. 10). A closer look, however, at the log files of the two Hidden Web crawlers 4 used reveals the main reason. First, Amazon.com was functioning erroneously when the adaptive crawler 4 visited it, resulting in a large number of lost results. Thus, it is suspected that the slightly poorer performance of the adaptive algorithm is due to this experimental variance.

As in the case of topic-specific Hidden Websites, the random-based policies exhibit poor performance compared to the other two algorithms when crawling generic sites. For the Amazon.com Website, the random-16K search succeeds in downloading almost 36.7% after issuing 775 queries. For the generic collection of dmoz, the fraction of the collection of links downloaded is 13.5% after the 770th query. Finally, as expected, the random-1M search is even worse than the random-16K search, downloading only 14.5% of Hidden Web pages from Amazon.com and 0.3% from the generic dmoz.

As seen in the experimental results, the adaptive algorithm performs remarkably well in all cases. The crawler 4 using the adaptive algorithm is able to discover and download most of the documents stored in Hidden Websites by issuing the least number of queries. When the collection refers to a specific topic, crawler 4 is able to identify the keywords most relevant to the topic of the site and consequently ask or query with terms that are most likely to return a large number of results. Finally, the random policy performs poorly with respect to its efficiency.

Figure 12:
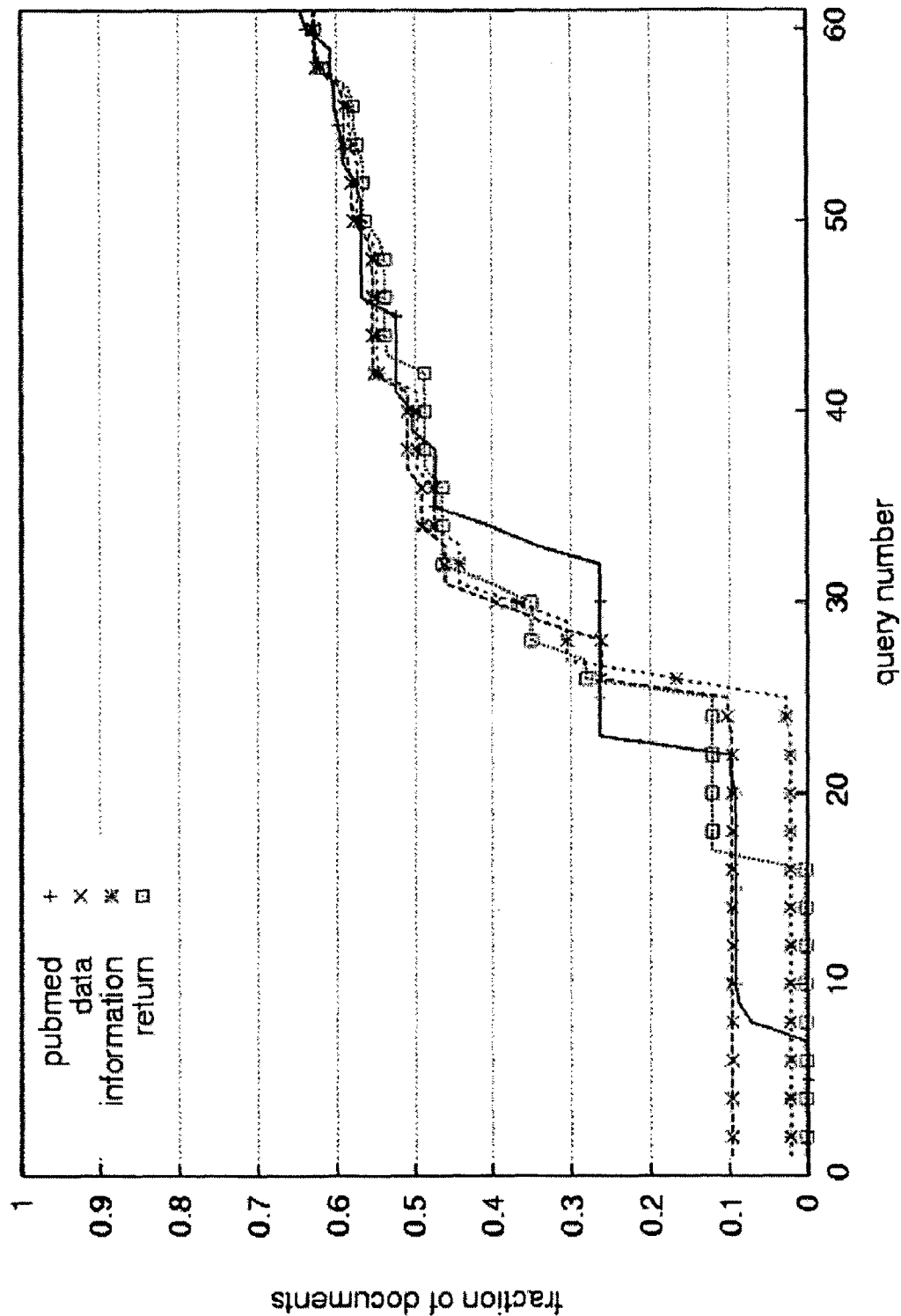
FIG. 12 is a graph illustrating the convergence of the adaptive algorithm given different initial queries (i.e., seed terms) for the PubMed Website.

The impact of the selection of the initial choice of the keyword in the adaptive algorithm was also examined for its affect, if any, on the effectiveness on subsequent iterations. The choice of the initial keyword is not done by the selection of the adaptive algorithm itself and has to be manually set, since the contents of the query statistics table 200 has not been populated yet. For this reason, three adaptive Hidden Web crawlers 4 were employed to target the PubMed Website with different seed-words. These seed-words included the word "data," which returned 1,344,999 documents, the word "information" that returned 308,474 documents, and the word "return" that retrieved 29,707 pages out of total of about 14 million. FIG. 12 illustrates the convergence of the adaptive algorithm under different initial queries.

These keywords or terms represent varying degrees of term popularity in PubMed, with the first word (i.e., data) being of high popularity, the second word (i.e., information) of medium popularity, and the third word (i.e., return) of low popularity. FIG. 12 also illustrates the results for the keyword "pubmed," which returned 695 articles. As can be seen from FIG. 12, after a small number of queries, all four crawlers roughly download the same fraction of the collection, regardless of their starting point. The respective coverage of each run is roughly equivalent at the $25^{th}$ query. Eventually, all four crawlers use the same set of terms for their queries, regardless of the initial query. In this specific experiment, from the $36^{th}$ query onward, all four crawlers use the same terms for their subsequent queries in each iteration (or the same terms are used off by one or two query numbers).

The results confirm the observation that the choice of the initial query has minimal effect on the final performance of the adaptive algorithm. The adaptive algorithm approximates the optimal set of queries to use for a particular Website. Once the algorithm has issued a significant number of queries, it has an accurate estimation of the content of the Website, regardless of the initial query. Since this estimation is similar for all runs of the algorithm, the crawlers 4 will use roughly the same queries.

Figure 13:
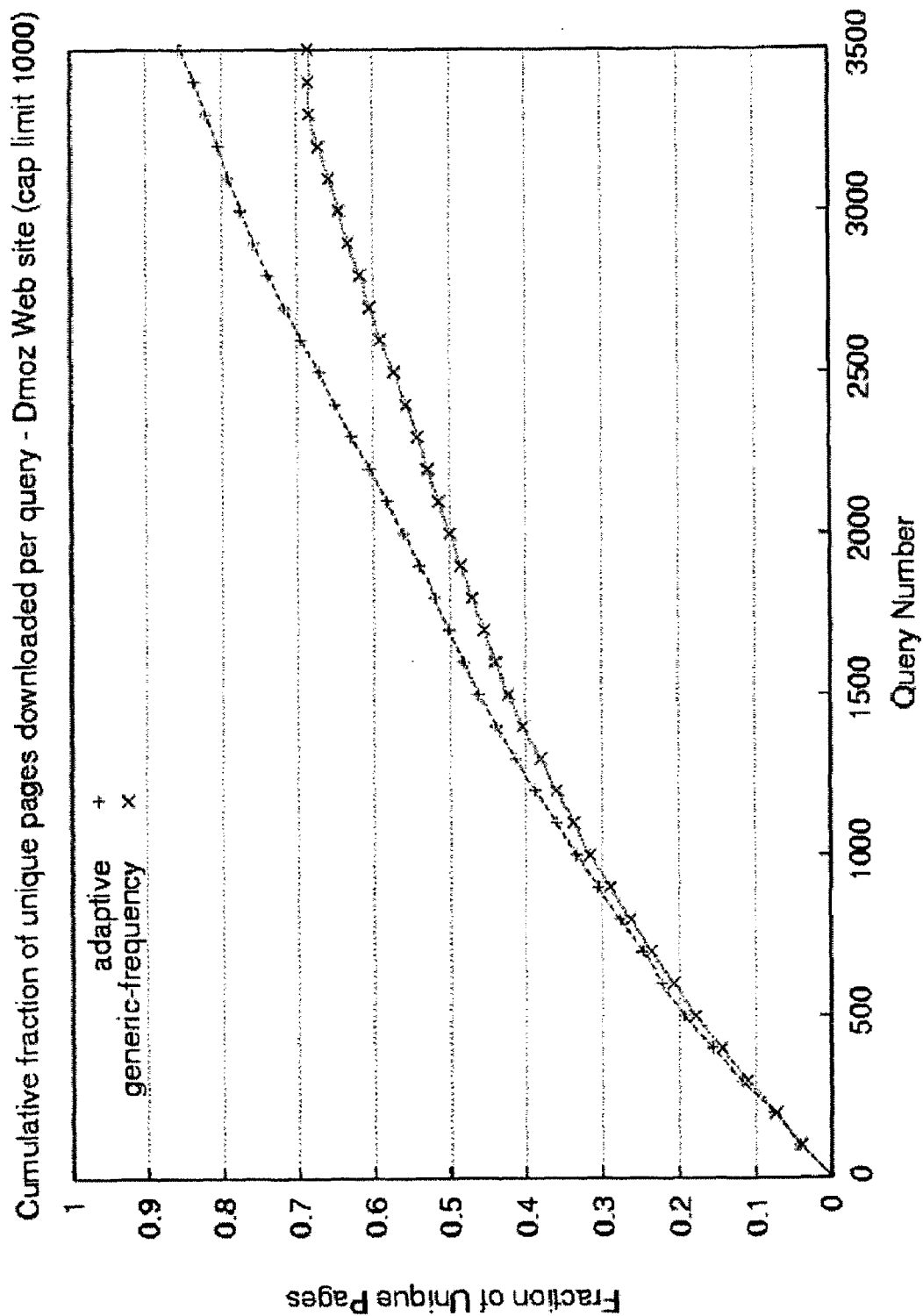
FIG. 13 is a graph illustrating the cumulative fraction of unique or new Web pages returned from the dmoz Website using the adaptive algorithm and the generic-frequency algorithm. The number of retrieved results was capped at 1,000 results per query.

While the Amazon.com and dmoz sites have limits of 32,000 and 10,000 results, respectively, in their result sizes, these limits may be larger than those imposed by other Hidden Websites. In order to investigate how a "tighter" limit in the result size affects the performance of our algorithms, two additional crawls were performed to the generic-dmoz site. Specifically, the generic-frequency and adaptive algorithms were run but retrieved only up to the top 1,000 results for every query. In FIG. 13, the coverage for the generic-frequency and adaptive algorithms is plotted as a function of the number of queries. As expected, by comparing the new result in FIG. 13 to that of FIG. 10 where the result limit was 10,000, the tighter limit requires a higher number of queries to achieve the same coverage. For example, when the result limit was 10,000, the adaptive algorithm could download 70% of the site after issuing 630 queries, while it had to issue 2,600 queries to download 70% of the site when the limit was 1,000. On the other hand, the results show that even with a tight result limit, it is still possible to download most of a Hidden Website after issuing a reasonable number of queries. For instance, the adaptive policy could download more than 85% of the site after issuing 3,500 queries when the limit was 1,000. Finally, the results show that the adaptive policy consistently outperforms the generic-frequency policy regardless of the result limit. In both FIG. 13 and FIG. 10, the adaptive algorithm shows significantly larger coverage than the generic-frequency policy for the same number of queries.

In the experimental results described above, the performance evaluation results assumed a simplified cost-model where every query involved a constant cost. Additional experiments were performed to test the performance of the adaptive and generic-frequency algorithms using Equation 2 to drive the query selection process. As discussed above, this query cost model includes the cost for submitting the query to the site, retrieving the result index page, and also the cost associated with downloading the actual Web pages. For these costs, we examined the size of every result in the index page and the sizes of the documents, where $c_q=100$, $c_r=100$, and $c_d=10000$ for the parameters of Equation 2. The test was run on the PubMed Website. The values set forth above that were selected imply that the cost for issuing one query and retrieving one result from the result index page are roughly the same, while the cost for downloading an actual page is 100 times larger. It is believed that these values are reasonable for the PubMed Website.

Figure 14:
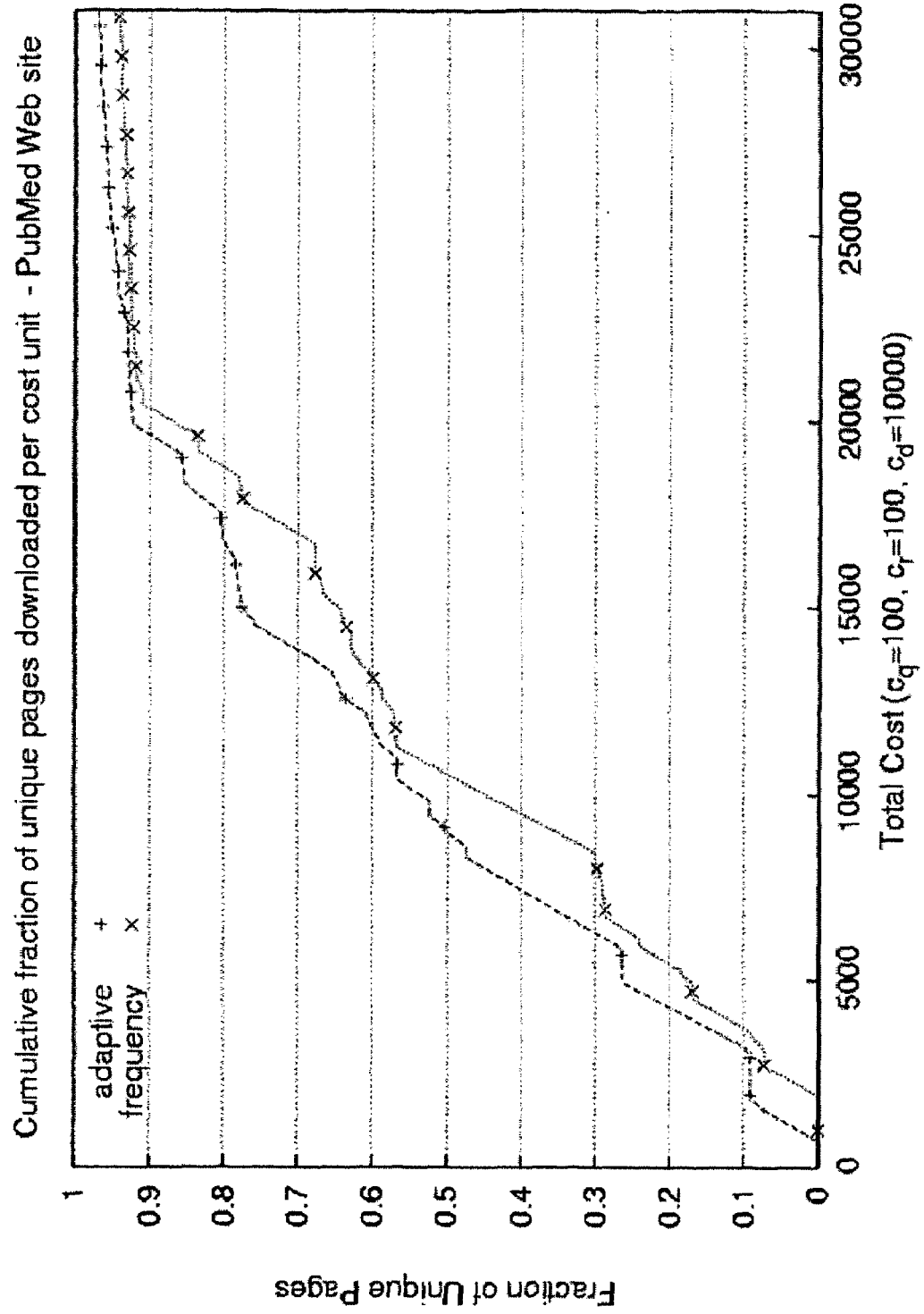
FIG. 14 is a graph illustrating the cumulative fraction of unique or new Web pages returned from the PubMed Website as a function of the resource units used during the download process for the adaptive and generic-frequency algorithms.

FIG. 14 shows the coverage of the adaptive and generic-frequency algorithms as a function of the resource units used during the download process. The horizontal axis represents the amount of resources used, and the vertical axis is the coverage. As it is evident from FIG. 14, the adaptive algorithm makes more efficient use of the available resources, as it is able to download more articles than the generic-frequency, using the same amount of resource units. However, the difference in coverage is less dramatic in this case, compared to the graph of FIG. 8. The smaller difference is due to the fact that under the assumed cost metric, the download cost of documents constitutes a significant portion of the cost. Therefore, when both algorithms (i.e., generic-frequency and adaptive) downloaded the same number of documents, the saving of the adaptive algorithm is not as significant as before. That is, the savings in the query cost and the result index download cost is a relatively small portion of the overall cost. Still, a noticeable savings is observed from the adaptive policy. At a total cost of 8000, for example, the coverage of the adaptive algorithm is roughly 0.5 while the coverage of the generic-frequency algorithm is only 0.3.

The web crawler 4 described herein may be used with single attribute databases as well as multi-attribute databases. For example, to generate queries for a multi-attribute database, the crawler 4 may exploit the fact that the site often returns Web pages that contain values for each of the query attributes. For example, when an online bookstore supports queries on title, author and ISBN, the Web pages returned from a query typically contain the title, author and ISBN of corresponding books. Thus, from the returned Web pages the values for each field (e.g., title="Harry Potter"; author="J. K. Rowling"; etc.) may be extracted. The frequency of each attribute value may be estimated and the most promising query term or keyword may be chosen for a subsequent query. A primary challenge is to automatically segment the returned pages so that the crawler 4 can identify the sections of the Web pages that present the values corresponding to each attribute. Since many Websites follow limited formatting styles in presenting multiple attributes, the crawler 4 may learn page-segmentation rules automatically from a small set of training examples. For example, most book titles are preceded by the label "Title." The crawler 4 may use this to identify the text following the word "title" as representative of the books' respective titles.

There are certain practical issues that should be addressed to build a fully automatic Hidden Web crawler 4. For example, the crawler 4 needs to interface correctly with different site-specific search interface 2. In one aspect, the crawler 4 may be pre-programmed or updated periodically with unique rules (e.g., protocol or formatting rules) for each particular Website or groups of Websites having Hidden Web page content. In another aspect, the crawler 4 may be extended with a software component for automatically learning the page-segmentation rules of the interface of a Hidden Web site, from a small set of training example-pages obtained from a Web site. Alternatively, the method proposed in J. Cope et al., Automated discovery of search interfaces on the web, *Proceedings of the $14^{th}$ Australasian Conference on Database Technologies,* 2003 may be employed. The content of this publication is incorporated by reference as if set forth fully herein. In addition, some Hidden Websites return their results in batches of, for example, 20 pages so the user has to click on a "next" button or similar link in order to see additional results. In this case, a fully automatic Web crawler 4 should know that the first result index page contains only a partial result and automatically "clicks" the next button or link. Finally, some Hidden Websites may contain an infinite number of Hidden Web pages which do not contribute much significant content (e.g., a calendar with links for every day). Consequently, the Hidden Web crawler 4 should be able to detect that the site does not have much more new or unique content and stop downloading pages from the site. For this purpose, the crawler 4 may include page similarity detection algorithms.

The invention described herein may be implemented in a system for downloading Hidden Web pages. The system includes a Web crawler 4 that issues a plurality of queries to a site-specific search interface 2 containing Hidden Web pages. The Hidden Web pages are downloaded and potential query terms are obtained from that actual content of the downloaded pages. One or more computers 6 or processors are configured to apply an adaptive algorithm to estimate the efficiency of each potential query term. For each subsequent query, the most efficient query term is issued to the site-specific search interface by the Web crawler 4. The system may store an index of each downloaded Hidden Web page such that the pages may be later accessed by a search engine.

As stated above, the crawler 4 utilizes an adaptive algorithm to identify and select an optimal query term for a next search based on the content of the Web pages previously downloaded from the Hidden Website. Experimental evaluation on actual Websites containing Hidden Web content shows that this algorithm has a great potential to rapidly download a significant portion of this hidden content. For example, in certain cases the adaptive algorithm can download more than 90% of a Hidden Website after issuing approximately 100 queries. Given these results, a crawler 4 of the type disclosed herein provides a mechanism to improve the search-engine coverage of the Web as well as the user experience of a Web-based search.

The crawler 4 and search method described herein is applicable to searching multi-lingual Hidden Websites without any additional modification. For example, the crawler 4 may be used to search Hidden Web pages having non-English content. The web crawler 4 is able to do this because the adaptive algorithm "learns" its vocabulary from the Web pages it downloads and is therefore able to discover frequent words that are not necessarily contained in the English dictionary. This is in contrast with the generic-frequency algorithm which is restricted by the language used in the corpus analyzed for the frequency distribution of keywords or terms.

While embodiments of the present invention have been shown and described, various modifications may be made without departing from the scope of the present invention. The invention, therefore, should not be limited, except to the following claims, and their equivalents.

We claim:

1. A computer-implemented method of downloading Hidden Web pages comprising:
    a) selecting a query term;
    b) issuing a query to a site-specific search interface containing Hidden Web pages;
    c) acquiring a results index;
    d) downloading the Hidden Web pages from the results index;
    e) identifying a plurality of potential query terms from the downloaded Hidden Web pages;
    f) estimating the efficiency of each potential query term based on a ratio of the number of new pages returned for a particular query to the cost of issuing the particular query wherein the cost of issuing the particular query is equal to $c_q + c_r P(q_i) + c_d P_{new}(q_i)$ where $P(q_i)$ represents the fraction of pages returned for a particular query $(q_i)$ and $P_{new}(q_i)$ represents the fraction of new pages returned for a particular query $(q_i)$, and where $c_q$ represents the cost of submitting the particular query, $c_r$ represents the cost of retrieving a results index page, and $c_d$ represents the cost for downloading a matching document;
    g) selecting a next query term from the plurality of potential query terms, wherein the next selected query term has the greatest efficiency; and
    h) issuing a next query to the site-specific search interface using the next query term.

2. The method of claim 1, wherein steps (c) through (h) are repeated a plurality of times.

3. The method of claim 1, wherein steps (c) through (h) are repeated a plurality of times until all the Hidden Web pages are downloaded.

4. The method of claim 1, wherein steps (c) through (h) are repeated a plurality of times until the number of new documents returned for one or more queries falls below a pre-set threshold.

5. The method of claim 1, wherein the query term selected in step (a) is selected from a plurality of terms located on the Web page containing the site-specific search interface.

6. The method of claim 1, further comprising the steps of creating an index of each downloaded Hidden Web page.

7. The method of claim 1, wherein the efficiency is proportional to the number of new pages returned for a particular query.

8. The method of claim 1, wherein the number of new pages returned $(P_{new}(q_i))$ for a particular query $(q_i)$ is equal to $P(q_i) - P(q_i \cup \ldots \cup q_{i-1}) P(q_i | q_1 \cup \ldots \cup q_{i-1})$ where $P(q_i)$ represents the fraction of pages returned for a particular query $(q_i)$.

9. The method of claim 1, wherein the site-specific search interface is a single-attribute search interface.

10. The method of claim 1, wherein the site-specific search interface is a multi-attribute search interface.

11. The method of claim 10, wherein for each attribute of the multi-attribute search interface, a plurality of potential query terms are identified from the downloaded Hidden Web pages.

12. The method of claim 1, wherein in step (d), the Hidden Web pages are downloaded from a plurality of partial results indexes.

13. The method of claim 1, wherein Hidden Web pages are obtained from a plurality of different Websites having Hidden Web pages.

14. The method of claim 1, wherein the method is implemented using a crawler software program.

15. The method of claim 1, wherein step (f) comprises updating a query statistics table with a number representative of how many times a query term $q_i$ appears within Web pages downloaded from $q_1, \ldots, q_{i-1}$.

16. A system for downloading Hidden Web pages comprising:
    a web crawler for issuing a plurality of queries to a site-specific search interface containing Hidden Web pages and downloading the Hidden Web pages, the Hidden Web pages containing a plurality of potential query terms; and
    wherein the web crawler is configured to:
        select a query term;
        issue a query to a site-specific search interface containing Hidden Web pages;

acquire a results index;
download the Hidden Web pages from the results index;
identify a plurality of potential query terms from the downloaded Hidden Web pages;
a computer configured to apply an algorithm to estimate the efficiency of each potential query term, wherein for each query, the most efficient query term is issued to the site-specific search interface by the web crawler; the algorithm comprising:
estimating the efficiency of each potential query term based on a ratio of the number of new pages returned for a particular query to the cost of issuing the particular query wherein the cost of issuing the particular query is equal to $c_q + c_r P(q_i) + c_d P_{new}(q_i)$ where $P(q_i)$ represents the fraction of pages returned for a particular query ($q_i$) and $P_{new}(q_i)$ represents the fraction of new pages returned for a particular query ($q_i$), and where $c_q$ represents the cost of submitting the particular query, $c_r$ represents the cost of retrieving a results index page, and $c_d$ represents the cost for downloading a matching document;
selecting a next query term from the plurality of potential query terms, wherein the next selected query term has the greatest efficiency; and
issuing a next query to the site-specific search interface using the next query term.

17. The system of claim 16, wherein the system stores an index of each downloaded Hidden Web page.

18. The system of claim 17, further comprising an Internet search engine having associated therewith an index of Web pages, wherein at least some of the indexed Web pages are Hidden Web pages.

* * * * *

UNITED STATES PATENT AND TRADEMARK OFFICE
CERTIFICATE OF CORRECTION

| | |
|---|---|
| PATENT NO. | : 7,685,112 B2 |
| APPLICATION NO. | : 11/570330 |
| DATED | : March 23, 2010 |
| INVENTOR(S) | : Ntoulas et al. |

Page 1 of 1

It is certified that error appears in the above-identified patent and that said Letters Patent is hereby corrected as shown below:

Title Page, Item (54) Title: replace "METHOD AND APPARATUS FOR RETRIEVING AND INDEXING HIDDEN PAGES" with -- METHOD AND APPARATUS FOR RETRIEVING AND INDEXING HIDDEN WEB PAGES --

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,685,112 B2  Page 1 of 1
APPLICATION NO. : 11/570330
DATED : March 23, 2010
INVENTOR(S) : Ntoulas et al.

It is certified that error appears in the above-identified patent and that said Letters Patent is hereby corrected as shown below:

Title Page, Item (54) and at Column 1, lines 1-3, Title: replace "METHOD AND APPARATUS FOR RETRIEVING AND INDEXING HIDDEN PAGES" with -- METHOD AND APPARATUS FOR RETRIEVING AND INDEXING HIDDEN WEB PAGES --

This certificate supersedes the Certificate of Correction issued June 15, 2010.

Signed and Sealed this

Twentieth Day of July, 2010

David J. Kappos
*Director of the United States Patent and Trademark Office*